Aug. 21, 1962  B. V. BHIMANI  3,050,681
METHOD FOR TESTING ELECTRICAL INSULATOR
Filed Feb. 4, 1960  2 Sheets-Sheet 1
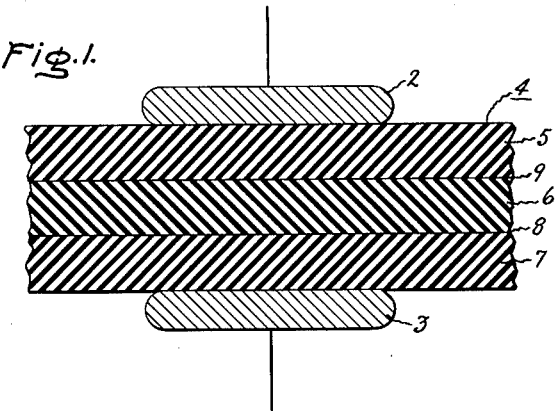
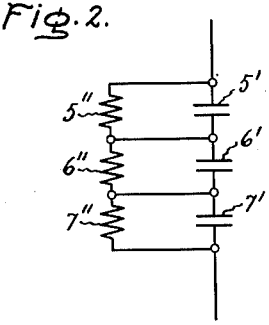
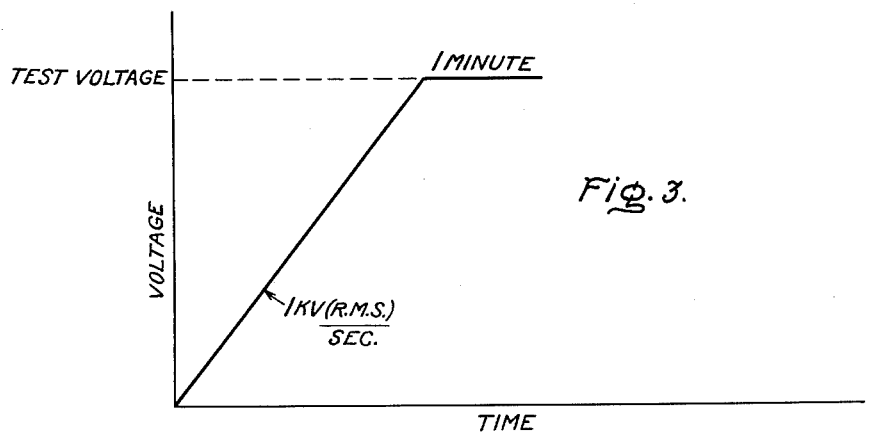
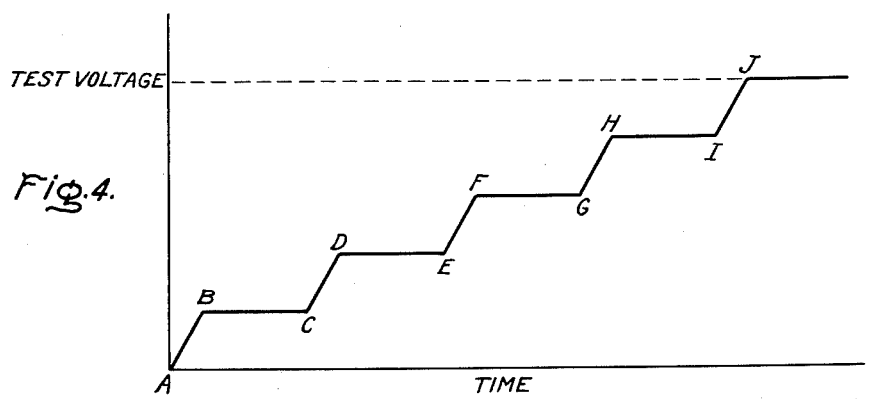
Inventor:
Bhupendrakumar V. Bhimani,
by *Alfred G. Hutter*
His Attorney.

Aug. 21, 1962  B. V. BHIMANI  3,050,681
METHOD FOR TESTING ELECTRICAL INSULATOR
Filed Feb. 4, 1960  2 Sheets-Sheet 2
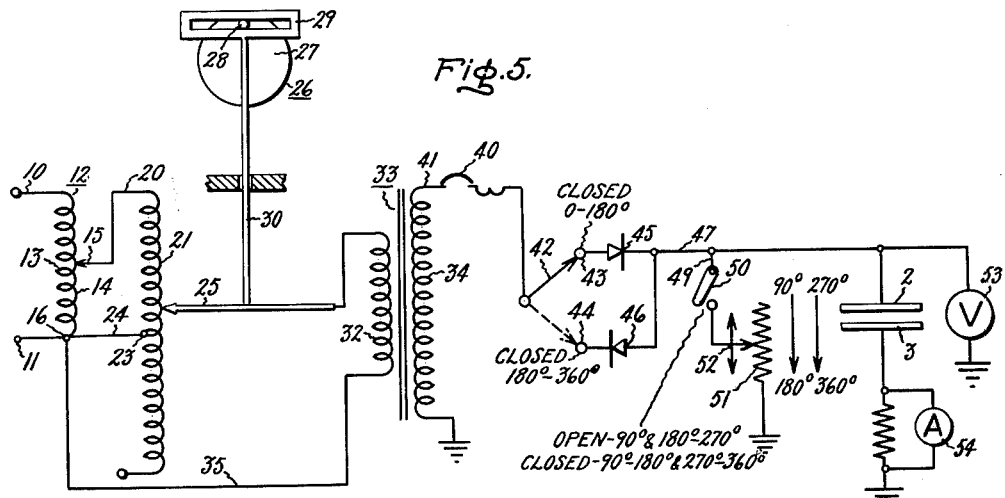
Fig.5.
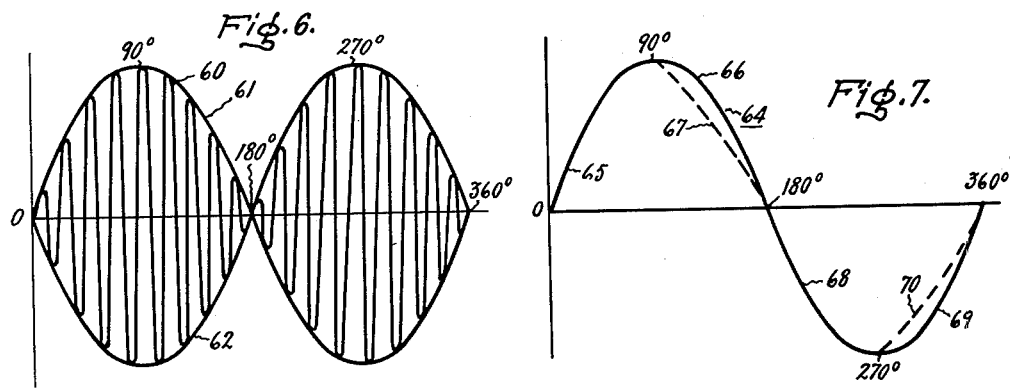
Fig.6.
Fig.7.
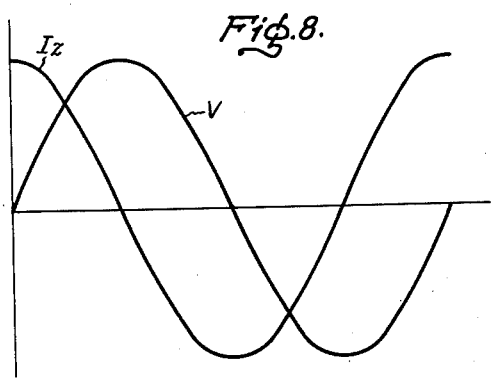
Fig.8.
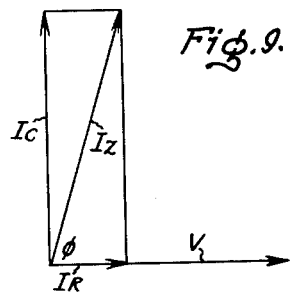
Fig.9.
Inventor:
Bhupendrakumar V. Bhimani,
by Alfons G. Hutter
His Attorney.

United States Patent Office 3,050,681
Patented Aug. 21, 1962

3,050,681
METHOD FOR TESTING ELECTRICAL INSULATOR
Bhupendrakumar V. Bhimani, Schenectady, N.Y., assignor to General Electric Company, a corporation of New York
Filed Feb. 4, 1960, Ser. No. 6,755
6 Claims. (Cl. 324—54)

This invention relates to a method for testing electrical insulation and, more particularly, to a method for performing alternating current tests on insulation in large alternating current equipment.

The insulation utilized in large alternating current equipment usually is of a composite nature, being fabricated of a plurality of layers of material, each layer having different capacitive and resistive characteristics. Since alternating current equipment is the subject of the test, the use of alternating current is the natural testing medium to duplicate operating conditions in the machine. In testing new equipment of this type, it is common to impress a voltage across the insulation of a magnitude of twice the rated voltage plus 1,000 volts. For example, 60 cycle per second equipment having an operating potential of 24 kilovolts may require a test voltage of about 50 kilovolts. Considering insulation having a capacitance of one microfarad, 1,000 kilovolt amperes may be required to conduct the test. Normally, it has been found that facilities are not usually available to provide such charging currents, and under certain circumstances such tests are not possible at all.

In recent years great consideration has been given to utilizing direct current as a testing medium for testing alternating current equipment. Great efforts have been made to validate tests of alternating current machinery with unidirectional current, and these tests are effective in limited circumstances. However, these tests may be accompanied by a phenomenon which may make the test destructive in nature. During the initial application of a unidirectional voltage across the insulation, the voltage drop across each layer of the composite insulation is determined by the capacitance characteristics of the material. After a suitable time interval, the voltage drop across each layer changes since the circuit becomes resistive in nature. It has been found that electrical charges collect in the planes between the composite layers of the insulation, and after prolonged periods there is initiated local bonder evaporation and ionization. This "interlayer ionization" may culminate in deterioration of the insulation.

Although tests utilizing unidirectional current have this disadvantage, they are often relied upon because of the inexpensive and portable nature of the unidirectional current testing equipment.

The chief object of the present invention is to provide an improved method for testing insulation utilizing alternating current.

Another object of the invention is to provide a low frequency alternating current testing procedure for use on alternating current equipment.

A still further object of the invention is an improved alternating current method for testing insulation wherein the test requires small charging currents.

These and other objects of my invention will become more readily apparent from the following description.

One of the features of the invention is a method for testing insulation for use in alternating current equipment operating with current supplied at service frequencies and potential in which the steps consist in applying a test alternating current voltage across the insulation, this test alternating current voltage having frequency less than 10% of the service frequency, increasing the potential of the test voltage to a predetermined level and terminating the test in response to a predetermined current. "Service frequency" as used herein denotes the usual operating frequency of the equipment when in normal use.

The attached drawings illustrate preferred embodiments of the invention, in which FIG. 1 is a sectional view of a composite insulation specimen located between test electrodes;

FIG. 2 is a schematic showing of an equivalent circuit showing the capacitive and resistive characteristics of the insulation shown in FIG. 1;

FIG. 3 is a diagram plotting voltage versus time for an alternating current test utilizing power frequencies;

FIG. 4 is a diagram plotting voltage versus time for testing insulation utilizing the present invention;

FIG. 5 is a schematic circuit diagram of a testing apparatus for practicing the present invention;

FIG. 6 is a diagram plotting voltage versus time of the voltage generated in a portion of the apparatus shown in FIG. 5;

FIG. 7 is a diagram plotting the voltage impressed on the test specimen;

FIG. 8 is a diagram plotting voltage and impedance current versus time for a test specimen; and FIG. 9 is a vector diagram of the currents in the test specimen considered in FIG. 8 showing the relationship of the various currents constituting the impedance current.

In FIG. 1 there are shown electrodes 2 and 3, which are adapted to impress a high potential across a section of composite insualtion 4. The composite insulation comprises layers 5, 6 and 7 which are separated by suitable boundary layer portions 8 and 9.

In FIG. 2 there is shown a schematic equivalent circuit of the insulation shown in FIG. 1. It is noted that each layer of composite insulation 4 has resistance and capacitance characteristics. Very often these characteristics vary along a single piece of insulation and with every layer of composite insulation. In FIG. 2 layer 5 is shown having a capacitance 5' and a resistance 5". The equivalent resistance and capacitance are connected in parallel. Similarly, second and third layers 6 and 7 have capacitances 6' and 7' and resistances 6" and 7".

It has been recognized for many years that a high potential test at service frequency is a reliable indicator of the suitability of an insulation system for the service period. However, because of the large charging kilovolt ampere quantity requirements of high capacity machines, unidirectional voltage has very often been considered a substitute for testing such insulation. This has facilitated testing by permitting the use of generating equipment of a smaller physical size and rating than is required for equivalent alternating current voltage testing. It has always been recognized, however, that there is a great difference in voltage distribution in laminated insulation under unidirectional voltage stresses as compared to alternating current voltage stresses.

An example of this difference in stress distribution is the previously noted phenomenon of "interlayer ionization." This occurs during unidirectional voltage tests wherein initially the capacitances, which are an inherent portion of the insulation system, are charged and then are gradually discharged causing charges of electricity to collect at the boundary portions 8 and 9, or as shown in FIG. 2 at the conductors 8' and 9'. This concentration of electrical charges may attack the insulation, causing the previously noted binder evaporation.

In considering a satisfactory high potential test for apparatus operating at service frequencies (approximately 60 cycles per second), the following characteristics are desirable:

(1) Voltage distribution inside a laminated or composite insulation in a manner similar to that occurring under operating stresses.
(2) Stresses on interlayer surfaces must be the same under test conditions as under operating conditions.

The present invention envisions the selection of a minimum test frequency between 0 cycles per second and service frequency (60 cycles per second) where the insulation capacitance characteristic exceeds its resistance sufficient to establish normal service frequency voltage distribution within acceptable limits.

As previously noted, each layer of the insulation may be represented by an equivalent circuit consisting of a capacitor with a leakage resistance connected in parallel therewith. A composite section of insulation is, therefore, a series of capacitors and resistors as illustrated in FIG. 2. A voltage across the insulation distributes according to the impedance of these elementary combinations of capacitance and resistance. The impedance of each layer of insulation may be represented by the equation:

$$(1) \qquad Z = \frac{R}{(1 + j2\pi fcR)}$$

where

Z is the impedance
R is the resistance
$f$ is the frequency
c is the capacitance Since in Equation 1 the term $(2\pi fcR)$ is very much greater than one, the quantity one may be neglected in the vector addition making $$(2) \qquad Z \approx \frac{1}{(j2\pi fc)}$$

Considering the equation in this light, the impedance is a function substantially only of the capacitance and frequency. That is to say, if the capacitive impedance is much smaller than the resistive impedance at a test frequency, the voltage distribution will be decided substantially only by the capacitive impedance.

Considering Equation 1, utilizing unidirectional voltage, the stresses in the insulation are solely resistive since the frequency is zero. At a frequency of 60 cycles, for example, the quantity $(j2\pi fcR)$ may be in the order of 100 for many of the components utilized in composite insulation systems. In such a case, the impedance as calculated by Equation 1 compared to the impedance determined by Equation 2 is in error by about 0.02% for the quantity $(j2\pi fcR) = 50$ and 0.005% for the quantity $(j2\pi fcR) = 100$.

Since the test levels normally utilized are arbitrarily determined (for example, twice the rated voltage plus 1,000 volts), it can be seen that this small amount of calculated error is vastly compensated by the possible use of smaller test equipment which substantially reproduces the operating environment. In considering testing equipment utilizing the approximation of Equation 2, it is preferable that the materials utilized in the composite insulation be of a nature wherein the quantity $(j2\pi fcR)$ is greater than ten. In such a case, the error will be within ½% under a 60 cycle stress.

In considering many of these low frequency tests, it has been found that frequencies less than 10% of the service or normal operating frequency may be utilized. Measurements of capacitance and parallel resistance have been conducted on materials used in insulation systems of 60 cycle per second equipment with frequencies ranging between 100 cycles per second to 1/10 cycle per second, each test providing substantially accurate indications of the behavior of the insulation in this range of frequencies. Measurement data indicates that the quantity $(2\pi fcR)$ is well above ten for each of the materials tested. This data indicates that the voltage distribution will be essentially determined by the capacitances of the various materials at frequencies in this range, even at 1/10 cycle per second frequencies.

As previously noted in a system wherein the test voltage may reach 50 kilovolts, service frequency being 60 cycles and the capacitance of the insulation system being one microfarad, 1,000 kilovolt amperes may be required to conduct the test. Since use of a frequency of 1/10 cycle per second provides a substantially valid test, in a situation where a capacitance of one microfarad exists and a test voltage of 50 kilovolts, the system requires only a 1.6 kilovolt ampere source.

In FIG. 3 there is shown a diagram plotting voltage versus time which illustrates a test procedure commonly used on alternating current equipment with service potential and frequency, the voltage being gradually increased at a rate of one kilovolt (root means square) per second. When the assigned test voltage is reached, the voltage is maintained for approximately one minute. In applying the test voltage to the specimen, a suitable circuit breaker is employed with suitable voltage measuring and recording equipment to terminate the test and to indicate at what voltage failure of the insulation occurred.

FIG. 4 is a diagram plotting test voltage versus time and illustrates the method for conducting tests on insulation employing the present invention. Voltage is increased from point A to point B. Since, for example, if 1/10 of a cycle per second alternating current is utilized, it will require ten seconds to complete a cycle, the build up of voltage versus time will not be instantaneous and is shown in FIG. 4 by the slant of the line A—B. At point B the voltage is maintained for at least two cycles, which in the case of 1/10 of a cycle current will constitute 20 seconds. It is believed that two cycles is a minimum time in which the voltage measuring equipment can accurately read the impressed voltage. At time C the voltage is increased to level D where it is again maintained for at least two cycles, and at point E the voltage is again increased. These voltages may be increased by substantially uniform increments until the voltage level J is achieved which is the maximum test voltage.

FIG. 5 is a schematic view of an apparatus for impressing low frequency alternating current across a test specimen which may be utilized in practicing the invention as shown in FIG. 4. Conductors 10 and 11 are connected to a suitable source of service current at a known potential and frequency, for example, 115 volts and 60 cycles. Conductors 10 and 11 are connected to an adjustable auto transformer 12, which comprises a primary winding 13 (the entire winding) and secondary winding 14 (the lower portion of winding 13). The winding relationship between the primary and secondary windings is determined by the position of the movable contact 15, whose position determines the voltage occurring across the secondary winding. Contact 15 is connected to adjustable auto transformer 20 which includes primary winding 21 (the entire winding). Auto transformer 20 has a center tap 23 connected by means of a conductor 24 to the lower terminal 16 of auto transformer 12. Auto transformer 20 also has associated therewith a movable contact 25 adapted to reciprocate along the windings of auto transformer 20. When contact 25 passes the center tap 23, the voltage occurring thereon is zero (the winding between tap 23 and contact 25 being the secondary winding). Movable contact 25 comprises a portion of a mechanism which is adapted to generate the low frequency alternating voltage envelope required for the previously described test. In order to change the frequency, the contactor is connected to reciprocating means 26 which by its motion will generate a substantially sinusoidal envelope for the 60 cycle carrier wave supplied by auto transformer 20. The magnitude of the envelope is, of course, determined by the position of contact 15.

In this embodiment, the means to reciprocate contactor 25 comprises a rotor 27 which may be connected to suitable drive means whose rate of rotation may be determined; that is, if a frequency of 1/10 cycle per second is desired, rotor 27 will rotate one complete turn in 10 seconds. Rotor 27 has mounted thereon a suitable crank pin 28 which engages the Scotch yoke 29 which will, by means of its connection to stem 30, reciprocate contact 25. At the midpoint of its reciprocating motion, contact 25 engages point 23 of transformer 20. This point constitutes the 0°, 180° and 360° datum points to be utilized hereinafter.

Contact 25 is connected to one of primary winding 32 of transformer 33, the other end of winding 32 being connected by means of conductor 35 to point 16 on auto transformer 12.

The nature of the voltage supplied to line 41 from the secondary winding 34 of transformer 33 is illustrated in FIG. 6 wherein the amplitude of carrier wave 60 increases from 0° to 90° and diminishes from 90° to 180° and, similarly, from 180° to 270° it increases and diminishes from 270° to 360°. This modulating carrier wave defines a substantially sinusoidal envelope illustrated by the curves 61 and 62. This type of wave is unsuitable for the test, and it is necessary to remove the carrier wave leaving an envelope illustrated as wave 64 in FIG. 7.

In order to achieve this sinusoidal wave form, the wave form shown in FIG. 6 is passed through line 41 (FIG. 5), through circuit breaker 40, and supplied to movable contact 42. Movable contact 42 is operatively associated with the Scotch yoke mechanism 26 so that the contact will engage terminal 43 between 0° and 180° and terminal 44 between 180° and 360°. Terminal 43 is connected through rectifier 45 to line 47, and terminal 44 is connected to line 47 through rectifier 46. The electrodes 2 and 3 are connected to line 47, and a suitable voltmeter 53 and recording mechanism may be provided to measure the voltage across the electrodes 2 and 3. Similarly, it is noted that electrode 3 is grounded and the line connecting the electrode to ground has connected therein suitable current measuring means 54 and recording means.

Considering the operation of the device so illustrated, it is noted that between 0° and 90° the curve illustrated as 65 in FIG. 7 is substantially generated. This is achieved by passing the wave form shown in FIG. 6 through movable contactor 42, through terminal 43, through rectifier 45, and through the electrodes 2 and 3, which are connected to the opposite sides of the insulation specimen. At 90° there is a decrease in voltage because of the nature of the generating apparatus. However, this change in voltage is resisted by the capacitive nature of the insulation specimen. Rather than have the voltage wave diminish from 90° to 180° as shown in FIG. 7, there is a tendency for the voltage curve to diminish only slightly because of the capacitance.

In order to discharge the capacitive charge on the insulation specimen, a circuit is provided through line 49, switch 50, and rheostat 51, which has associated therewith the movable contact 52. This contact 52 is also associated with the rotor 27, which is associated with the Scotch yoke mechanism 26. By this means the capacitive charge on the insulation is selectively discharged to permit the voltage to return to 0 at 180°, as illustrated by curve 67 in FIG. 7, in a manner to be more fully described hereinafter.

Considering the operation of the apparatus in FIG. 7, conductors 10 and 11 are connected to a suitable source of voltage at service frequency. This voltage is applied to the auto transformer 12, whose output is supplied to auto transformer 20. Because of the particular speed of rotation of rotor 27, the output of auto transformer 20 has a voltage whose magnitude varies, as previously noted, at a frequency less than 10% of the service frequency. This voltage is transformed to a higher level in high voltage transformer 33, the output of which is passed through line 41. The nature of the voltage is illustrated in FIG. 6. The wave envelope 61 shown in FIG. 6, between 0° and 90°, is passed through movable contact 42, through terminal 43, through rectifier 45, through line 47, and then passed through the test specimen. At 90° the switch 50 is closed, permitting the capacitive charge on the test specimen to be discharged through the line 49 to ground. The rate of discharge is controlled by the rheostat 51, whose contact 52 is operatively associated by conventional mechanical means with rotor 27 of the Scotch yoke mechanism 26. This rheostat permits discharge of the capacitive charge on the test specimen in the manner illustrated by curve 67 in FIG. 7. This permits the voltage impressed on the test specimen, as a result of the wave passed from the rectifier 45, to follow the curve shown as 66 in FIG. 7. At 180° the entire resistance of rheostat 51 is removed. It will be noted, that between 0° and 180°, the impressed voltage across the test specimen is substantially sinusoidal, and this wave is at a frequency less than 10% of the service frequency. This is achieved by removing the carrier wave and also by discharging the electrical charge from the insulation between 90° and 180°.

At 180° the movable contact 42 is removed from terminal 43 and connected to terminal 44. This permits generation of the curve 68, shown between 180° and 270°, in FIG. 7. At 270° the insulation specimen is again charged, and it is necessary to remove the charge. This is achieved by the circuit including line 49 in switch 50 and rheostat 51. The discharge curve is illustrated as curve 70 shown in FIG. 7. The voltage impressed on the test specimen between 270° and 360° is illustrated by the curve 69. It will be noted that between 0° and 360° there is impressed across the insulation a test voltage having low frequency and being substantially sinusoidal in nature.

In performing the test, the procedure outlined in describing FIG. 4 is followed. The voltage is increased in incremental steps by manipulation of contact 15 (FIG. 5) which increases the magnitude of the potential impressed on the test specimen.

There has been described a method for conducting low frequency high potential tests. This method of testing has the further advantage of permitting a consideration of the behavior of the test specimen during the testing procedure. As previously noted, the nature of the current passing through the test specimen is of a resistive and capacitive nature. It has also been noted that the charge is substantially capacitive, the resistance currents being extremely small. However, these small resistance currents are an indication of the condition of the insulation, indicating such factors as moisture content, and the existence of dirt and other imperfections in the insulation. The magnitude of the resistance current may be readily ascertained since this resistance current contributes to determining the phase angle of the impedance current with respect to the impressed voltage on the insulation specimen.

Referring to FIG. 8, there is shown a diagram plotting impedance current and voltage versus time, and showing their phase angle relationship. In testing insulation of the type described, it is noted that the impedance current leads the voltage by approximately 90°.

In FIG. 9 there is shown a vector diagram illustrating the relationship between voltage V, the resistance current $I_R$, the capacitive current $I_C$, and the resultant impedance current $I_Z$. By noting the phase angle $\phi$, which is the phase angle between the impedance current and the impressed voltage, there is provided an indication of the resistance current $I_R$. From this diagram it is clear that the phase angle φ will give a direct indication of a high resistance current, giving an indication of the condition of the insulation.

By the present test procedure it is relatively easy to perform a power factor test to determine the existence of dangerous resistance currents in the insulation. This may be done by inexpensive equipment, since low frequency voltage is being applied across the insulation. Recording of voltage and impedance current may be readily taken and the phase angle readily ascertained, as is shown in FIG. 8. In conducting tests on these test specimens, the tests may be terminated upon measurements indicating a large resistance current passing through the insulation as manifested by a particular phase angle relationship between the voltage and impedance current.

The present invention provides a method of testing alternating current equipment insulation in a manner wherein large charging currents are not necessary and yet the desirable characteristics of alternating current testing are present. Stresses similar to those encountered by the equipment during normal operation are created during the test. This has a great advantage when contrasted to methods utilizing unidirectional voltages for testing wherein interlayer ionization may occur causing destruction of the insulation due to a phenomenon which is never encountered during normal alternating current operation.

While there have been described preferred embodiments of the present invention, it will be understood that the invention is not limited thereto since it may be otherwise embodied within the scope of the appended claims.

What I claim as new and desire to secure by Letters Patent of the United States is:

1. In a method for testing electrical insulation for use in alternating current equipment utilizing alternating current at a predetermined service frequency, the steps which consist in applying a wave of alternating voltage across the insulation, the wave having a frequency less than 10% of the service frequency, increasing the magnitude of the voltage to a predetermined level, and terminating the test in response to a predetermined value of current whereby the power required is substantially less than the power required to perform the test at service frequency.

2. In a method for testing electrical insulation for use in alternating current equipment utilizing alternating current at a service frequency, the steps which consist in applying a test alternating voltage across the insulation having a frequency between $1/100$ and 5 cycles per second, increasing the potential of the test voltage to a predetermined level and terminating the test in response to a predetermined current, the power required to conduct the test at the test frequency being substantially less than the power required to perform the test at service frequency.

3. In a method for testing electrical insulation for use in alternating current equipment utilizing alternating current at a service frequency, the steps which consist in applying a test alternating voltage across the insulation having a frequency less than 10% of the service frequency, increasing the test potential in incremental steps, maintaining the potential substantially constant for at least two cycles after increasing the voltage an increment and terminating the test in response to a predetermined current, the charging power required being very substantially less than the power required to perform the test at the service frequency.

4. In a method for testing electrical insulation for use in alternating current equipment operating with alternating current at a service frequency, the steps which consist in applying a test alternating voltage across the insulation having a frequency between $1/100$ and 5 cycles per second, increasing the test potential substantially in incremental steps, maintaining the potential substantially constant for at least two cycles after increasing the voltage an increment and terminating the test in response to a predetermined current, the power required being very substantially less than the power required to perform the test at the service frequency.

5. In a method for testing electrical insulation for use in alternating current equipment utilizing alternating current at a predetermined service frequency, the steps which consist in applying a wave of alternating voltage across the insulation, the wave having frequency less than 10% of the service frequency, measuring the voltage wave impressed across the insulation, measuring the impedance current wave passing through the insulation, and terminating the test in response to a phase angle between the impedance current and the voltage less than a predetermined value.

6. In a method for testing electrical insulation for use in alternating current equipment utilizing alternating current at a predetermined service frequency, the steps which consist in applying a wave of alternating voltage across the insulation, the wave having a frequency between $1/100$ and 5 cycles per second, measuring the voltage wave impressed across the insulation, measuring the impedance current wave passing through the insulation, and terminating the test in response to a phase angle between the impedance current and the voltage less than a predetermined value.

References Cited in the file of this patent

UNITED STATES PATENTS

| 2,532,336 | Rufolo | Dec. 5, 1950 |
| 2,834,940 | Dermer et al. | May 13, 1958 |

OTHER REFERENCES

Delerno: A.I.E.E. Technical Paper, 44–29, December 1943.